US011955871B2

United States Patent
Ramsey et al.

(10) Patent No.: US 11,955,871 B2
(45) Date of Patent: Apr. 9, 2024

(54) EMOTOR CONNECTION ARRANGEMENT WITH PHASE BAR COOLING AND COMPLIANT INTERNAL SUPPORT IN THE JUNCTION BOX

(71) Applicant: Schaeffler Technologies AG & Co. KG, Herzogenaurach (DE)

(72) Inventors: John Ramsey, Mansfield, OH (US); Jacob Pfeifer, Canal Fulton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 386 days.

(21) Appl. No.: 17/487,016

(22) Filed: Sep. 28, 2021

(65) Prior Publication Data

US 2023/0098164 A1    Mar. 30, 2023

(51) Int. Cl.
*H02K 11/33* (2016.01)
*H02K 5/20* (2006.01)
*H02K 5/22* (2006.01)
*H02K 7/10* (2006.01)

(52) U.S. Cl.
CPC ............... *H02K 5/225* (2013.01); *H02K 5/20* (2013.01); *H02K 7/10* (2013.01); *H02K 11/33* (2016.01)

(58) Field of Classification Search
CPC .......... H02K 11/33; H02K 11/30; H02K 7/10; H02K 5/225; H02K 5/203; H02K 5/20; H02K 3/28; H02K 9/00; H02K 9/02; H02K 9/04; H02K 9/06; H02K 9/08; H02K 9/19; H02K 9/193; H02K 9/197

USPC .......................................... 310/71, 52, 53, 54
See application file for complete search history.

(56) References Cited

U.S. PATENT DOCUMENTS

| | | | |
|---|---|---|---|
| 6,429,379 | B1 | 8/2002 | Yoshigi |
| 2004/0206558 | A1 | 10/2004 | Kabasawa et al. |
| 2010/0139896 | A1* | 6/2010 | Chamberlin ........... H02K 5/225 439/190 |
| 2017/0079129 | A1* | 3/2017 | Chin ....................... B60R 16/02 |
| 2021/0013764 | A1 | 1/2021 | Heien et al. |

FOREIGN PATENT DOCUMENTS

| | | |
|---|---|---|
| EP | 3488514 | 9/2021 |
| KR | 1020110052448 | 5/2011 |

* cited by examiner

*Primary Examiner* — Alexander A Singh
(74) *Attorney, Agent, or Firm* — Volpe Koenig

(57) ABSTRACT

An emotor connection arrangement for connecting power electronics of an electric or hybrid electric vehicle to an emotor. The emotor connection arrangement includes a junction box configured to extend from the power electronics to the emotor, and phase bars that extend in the junction box and electrically connect the power electronics to the emotor. A first access cover is removably connected to the junction box and configured to provide access for connecting the phase bars to the emotor, and a second access cover provides similar access for connecting the phase bars to the power electronics. In order to prevent overheating, the first access cover includes a cooling fluid channel with a cooling fluid inlet configured to be connected to a cooling fluid source and a cooling fluid outlet configured to be connected to a cooling fluid return.

18 Claims, 5 Drawing Sheets

EMOTOR CONNECTION ARRANGEMENT WITH PHASE BAR COOLING AND COMPLIANT INTERNAL SUPPORT IN THE JUNCTION BOX

FIELD OF INVENTION

The present disclosure relates to emotors (electric motors) used in electric or hybrid electric vehicles, and more specifically to the phase bars used to connect the power electronics to the emotor that extend through a junction box between the power electronics and the emotor.

BACKGROUND

In electric vehicles and hybrid electric vehicles, the power electronics must be connected to the emotor in order to deliver the required electrical current. One known method to connect the power electronics to the emotor is to use phase bars or leads that extend through a junction box. However, depending on the current loads, the phase bars as well as the bolted connection to the emotor can overheat.

Additionally, the phase bars need to be held securely in the junction box across a wide range of tolerances, which can be influenced by heat as well as other factors, in order to avoid vibration.

SUMMARY

In one aspect, an emotor connection arrangement for connecting power electronics of an electric or hybrid electric vehicle to an emotor is provided. The emotor connection arrangement includes a junction box that is configured to extend from the power electronics to the emotor, and phase bars that extend in the junction box and are adapted to electrically connect the power electronics to the emotor. A first access cover is removably connected to the junction box and configured to provide access for connecting the phase bars to the emotor, and a second access cover is removably connected to the power electronics and configured to provide access for connecting the phase bars to the power electronics. In order to prevent overheating, the first access cover includes a cooling fluid channel with a cooling fluid inlet configured to be connected to a cooling fluid source and a cooling fluid outlet configured to be connected to a cooling fluid return.

In one arrangement, the first access cover includes a bottom surface that is configured to contact a potting material surrounding a connection part of the emotor that the phase bars are electrically connected to in order to provide cooling.

In one embodiment, the cooling fluid channel has a linear path and the cooling fluid inlet and the cooling fluid outlet are located on opposite sides of the first access cover. Alternatively, in another embodiment, the cooling fluid channel can have a non-linear or curved path. In one arrangement, the curved path is arranged such that the cooling fluid inlet and the cooling fluid outlet are located on a same side of the first access cover.

In another aspect, the junction box includes a first housing part and a second housing part that are configured to be connected together in an assembled position. A first insulating retainer is provided and is configured to receive the phase bars. A second insulating retainer is also provided and is configured to be placed on the first insulating retainer such that the phase bars are held between the first and second insulating retainers. Elastic tabs located on at least one of the first or second insulating retainers, with the elastic tabs being configured to contact a respective inner surface of at least one of the first housing part or the second housing part, and the elastic tabs are further configured to generate a preload that presses the first and second insulating retainers toward one another and against the phase bars upon the first and second housing parts being connected together in the assembled position.

In one embodiment, the elastic tabs are located on each of the first and second insulating retainers.

In one arrangement, the first insulating retainer includes channels in which the phase bars are located that insulate the phase bars from one another. Additionally, the second insulating retainer includes clamping protrusions that are aligned with the channels in the first insulating retainer for clamping against the phase bars.

In one embodiment, at least one of the first or second insulating retainer includes an alignment projection and the other of the first or second insulating retainer includes a corresponding alignment receptacle that receives the alignment projection.

The elastic tabs are configured to compensate for total tolerance accumulations of 4 mm and apply the preload that presses the first and second insulating retainers toward one another and against the phase bars. This prevents movement of the phase bars due to vibration.

In one embodiment, the first and second insulating retainers are formed of a glass filled polymer. Here, the glass can be between 10 and 50 wt-% of the glass filled polymer, and the polymer can be PPS.

In one embodiment, the junction may include a seal on its upper housing to prevent water ingress when it is bolted to the power electronics.

In another aspect, an electric vehicle drive, for a hybrid electric or electric vehicle is provided and includes an emotor including a stator and a rotor, a transmission including a torque converter, and the rotor being connectable to the torque convertor. Power electronics configured to supply power to the emotor are provided. An emotor connection arrangement configured to connect the power electronics to the emotor is also provided and can include one or more of the features noted above.

It is noted that various ones of the above-noted features can be used alone or in combination with one another.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Figure 1:
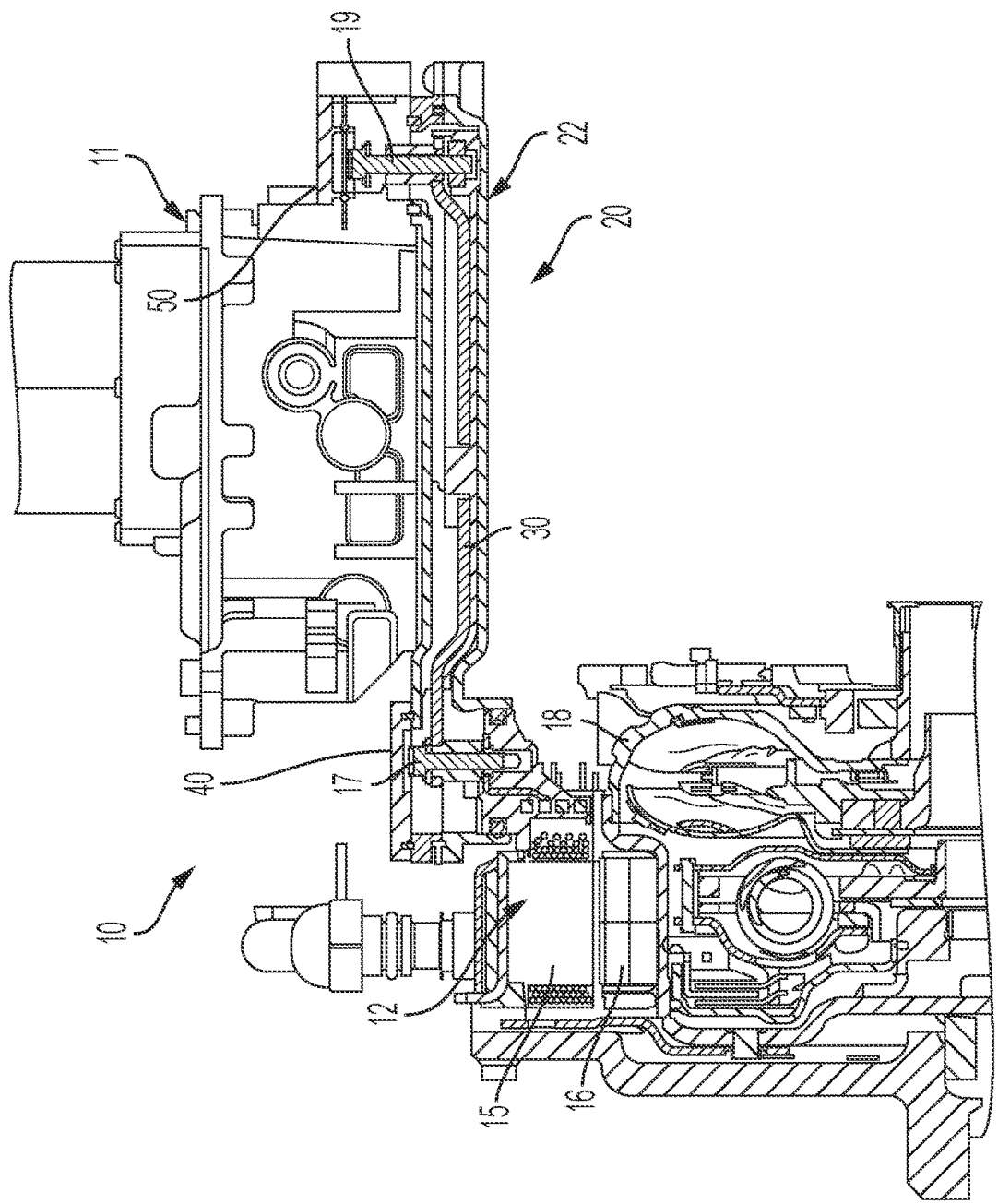
FIG. 1 is a schematic view, partially in cross-section, showing an electric vehicle drive including an emotor, power electronics, as well as a transmission connected to the emotor, and an emotor connection arrangement connecting the power electronics to the emotor.

Certain terminology is used in the following description for convenience only and is not limiting. The words "inwardly" and "outwardly" refer to directions toward and away from the parts referenced in the drawings. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or − 10% of an indicated value unless otherwise noted. The terminology includes the words specifically noted above, derivatives thereof and words of similar import.

Referring to FIG. 1, an electric vehicle or hybrid electric vehicle drive (collectively, an electric vehicle drive) arrangement 10 is shown somewhat schematically. The electric vehicle drive arrangement 10 includes power electronics 11 that are configured to supply power to an emotor 12, along with the emotor 12. The emotor 12 includes a stator 15 and a rotor 16 that is rotatable relative to the stator 15. The emotor is integrated into or configured to be drivably engaged with a transmission that includes a torque converter 18, with the rotor 16 being selectively connectable to the torque converter 18. While this arrangement is shown in connection with a hybrid electric drive for a motor vehicle, those skilled in the art will understand that this could be used in connection with an electric vehicle, with the rotor being connected to a transmission or further part of a vehicle drive line, possibly without the use of the torque converter or transmission.

Figure 2:
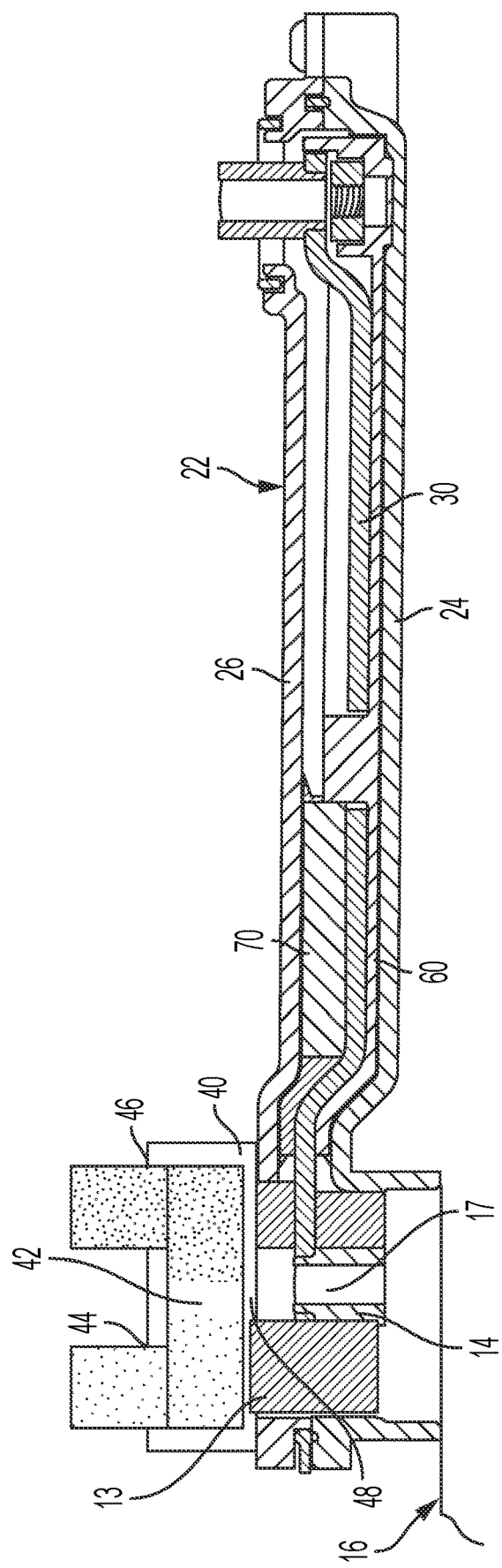
FIG. 2 is an enlarged view showing the emotor connection arrangement in cross-section.

Referring to FIGS. 1 and 2, an emotor connection arrangement 20 for connecting the power electronics 11 to the emotor 12 is also shown. The emotor connection arrangement 20 includes a junction box 22 that is configured to extend from the power electronics 11 to the emotor 12. Phase bars 30 extend in the junction box 22 and are adapted to electrically connect the power electronics 11 to the emotor 12. This is preferably accomplished via a bolted connection 17 (shown in FIG. 1), between the phase bars 30 and the connection at the emotor 12 along with a further bolted connection 19 (shown In FIG. 1) between the phase bars 30 and the power electronics 11. While the side view shown in FIGS. 1 and 2 only shows one of the phase bars 30, it will be understood by those skilled in the art that there are three phase bars, preferably made of copper or another conductive material, that extend between the power electronics 11 and the emotor 12. These are generally spaced apart from one another and held in an insulated manner within the junction box 22, for example by first and second insulating returners, discussed below in connection with FIGS. 5-8.

Still referring to FIG. 1, a first access cover 40 is removably connected to the junction box 22 and configured to provide access for connecting the phase bars 30 to the emotor 12, for example, by installing the bolts used in connection with the bolted connection 17. Additionally, a second access cover 50 is removably connected to the power electronics 10 and is configured to provide access for connecting the phase bars 30 to the power electronics 10, for example using the bolted connection 19. While bolted connections are shown, those skilled in the art will recognize that other types of connections can be utilized.

Figure 4:
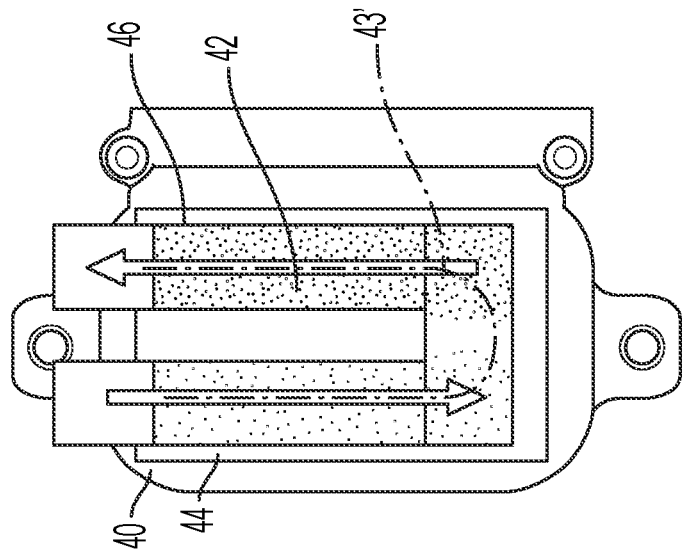
FIG. 4 is a top view of an alternate embodiment of the access cover for the emotor connection arrangement including an alternate cooling fluid channel.
Figure 3:
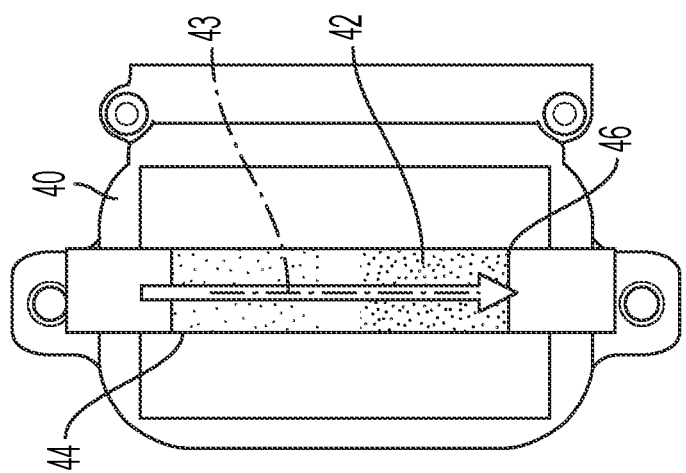
FIG. 3 is a top view showing the access cover for the emotor connection arrangement which includes a cooling fluid channel.

In order to prevent overheating of the phase bars as well as the connection to the emotor 12, as shown in FIGS. 2-4, the first access cover 40 includes a cooling fluid channel 42 with a cooling fluid inlet 44 configured to be connected to a cooling fluid source and a cooling fluid outlet 46 configured to be connected to a cooling fluid return. Preferably, first access cover 40 includes a bottom surface 48 that it configured to contact a potting material 13, which can be made of silicone or another electrically insulating material, that surrounds a connection part 14 of the emotor 12 (shown on FIG. 2) that the phase bars 30 are electrically connected to. The first access cover 40 is preferably made of a metallic material, such as aluminum. However, it could also be made of a thermally conductive polymeric material.

As shown in FIG. 3, the cooling fluid channel 42 according to one embodiment has a linear path 43 and the cooling fluid inlet 44 and the cooling fluid outlet 46 are located on opposite sides of the first access cover 40. In an alternative embodiment as shown in FIG. 4, the cooling fluid channel 42 in the first access cover 40 has a curved path 43'. Here, in one arrangement, the curved path 43' is arranged such that the cooling fluid inlet 44 and the cooling fluid outlet 46 are located on a same side of the first access cover 40. However, they could also be located on adjacent sides, depending on the particular application.

The cooling fluid inlet 44 and the cooling fluid outlet 46 can be connected to the engine coolant system using known fluid connectors. Alternatively, they could be connected to a transmission or other cooling system.

Figure 5:
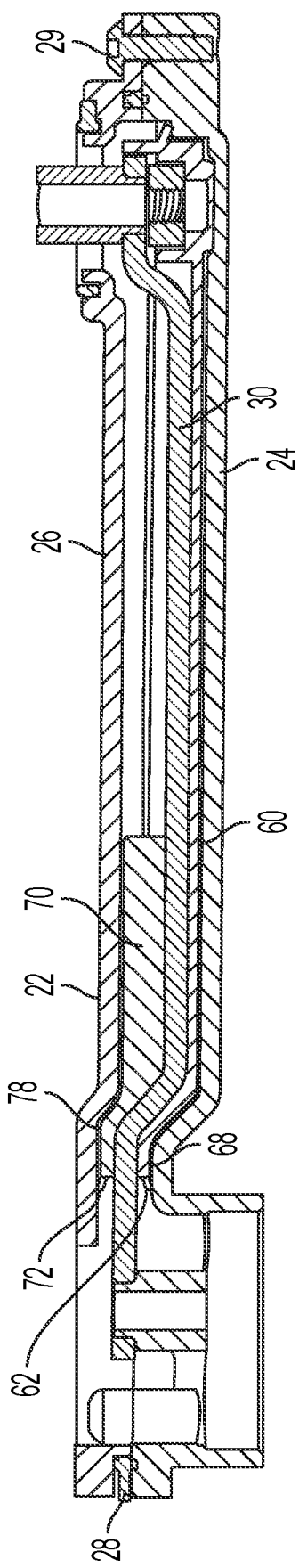
FIG. 5 is a side view, partially in cross-section, showing the junction box for the emotor connection arrangement which includes a pre-loaded retainer configuration that holds the phase bars in place.
Figure 6:
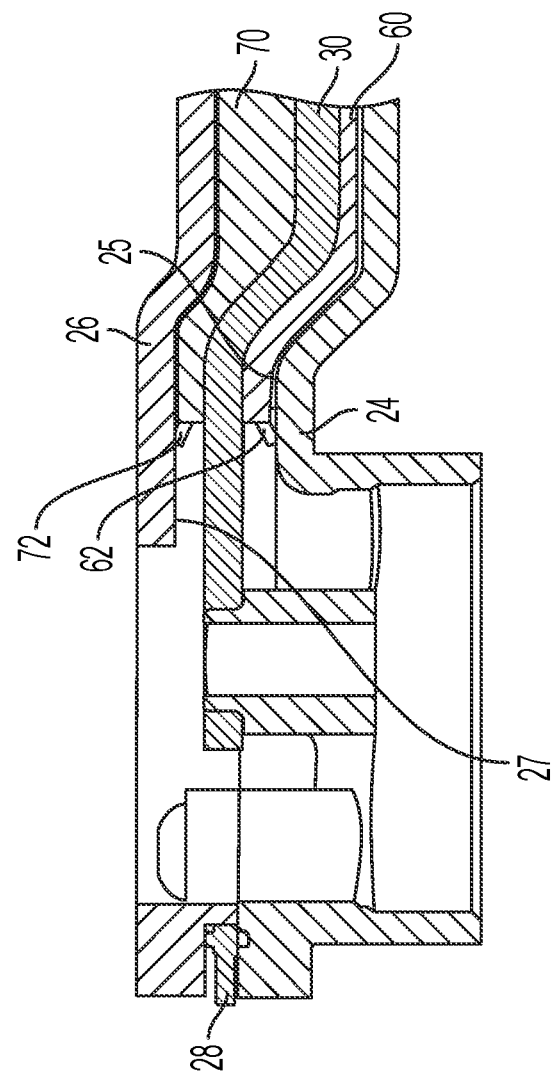
FIG. 6 is an enlarged view of the arrangement shown in FIG. 5 which shows elastic tabs located on the first and second insulating retainers that hold the phase bars.

Referring now to FIGS. 5-8, in one embodiment the junction box 22 includes a first housing part 24 and a second housing part 26 that are configured to be connected together in an assembled position. As shown in FIGS. 5 and 6, a gasket 28 can be provided between the first housing part 24 and the second housing part 26 in order to prevent the ingress of moisture or debris.

Figure 7:
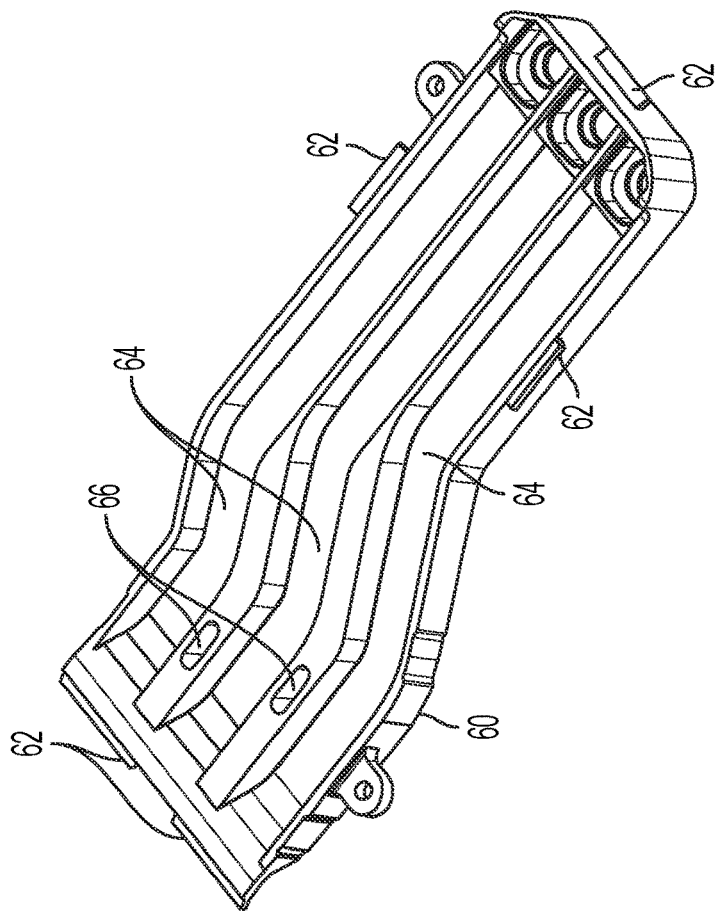
FIG. 7 is a perspective view showing an embodiment of the first insulating retainer.

In order to prevent the phase bars 30 from vibrating during use, a first insulating retainer 60 is located within the junction box 22 and is configured to receive the phase bars 30. As shown in FIG. 7, the first insulating retainer 60 is configured with three spaces to receive three of the phase bars 30. Additionally, second insulating retainer 70 is configured to be placed on the first insulating retainer 60 such that the phase bars 30 are held between the first and second insulating retainers 60, 70 within the junction box 22. The first and second insulating retainers 60, 70, are formed of an insulating material having elastic properties, and are more preferably formed of a glass filled polymer material. In one embodiment, the glass is between 5 and 50 wt-% of the glass filled polymer, and the polymer is PPS.

Figure 8:
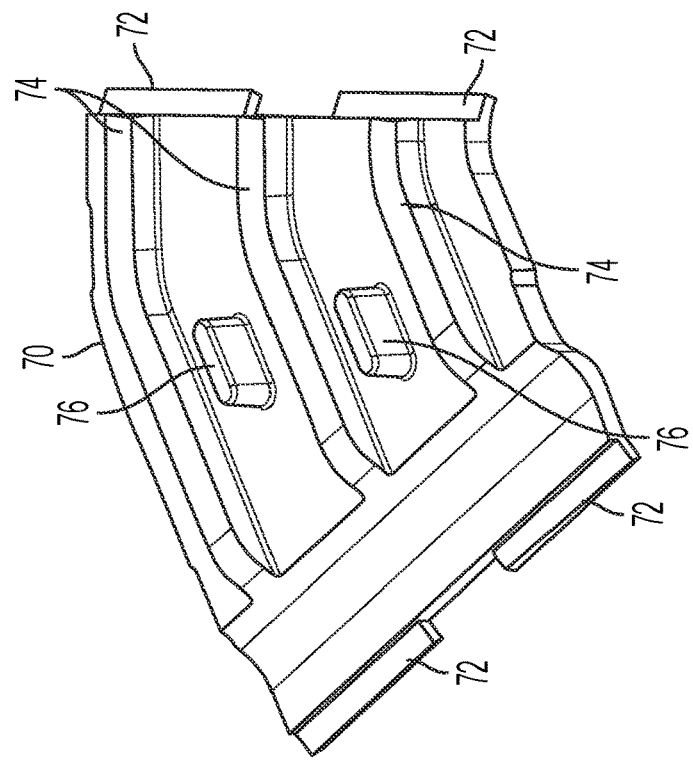
FIG. 8 is a perspective view showing an embodiment of the second insulating retainer which is adapted to be assembled with the first insulating retainer shown in FIG. 7.

In order to prevent vibration and compensate for tolerance accumulations as well as any heat induced expansion of the phase bars 30 or the junction box 22, elastic tabs 62, 72, shown in detail in FIGS. 6-8, are located on at least one of the first or second insulating retainers 60, 70, and preferably on both of the insulating retainers 60, 70. The elastic tabs 62, 72 are configured to contact a respective inner surface 25, 27 of at least one of the first housing part 24 of the second housing part 26, and preferably, both the first housing part 24 and the second housing part 26. The elastic tabs 62, 72 are configured to generate a preload the presses the first and second insulating retainers 60, 70 toward one another and against the phase bars 30 upon the first and second housing parts 24, 26 being connected together in the assembled position, for example using screws 29 around the periphery of the junction box 22, one of which is shown in FIG. 5.

The elastic tabs 62, 72 preferably are designed to provide a minimum interference upon the junction box 22 being assembled of 0.5 mm in order to provide a preload. In a preferred arrangement, the elastic tabs 62, 72 are configured to compensate for tolerance accumulations of 4 mm while still applying the preload that presses the first and second insulating retainers 60, 70 toward one another and against the phase bars 30.

Referring to FIGS. 7 and 8, in order to securely hold the phase bars 30 in position and prevent them from coming into contact with one another or the junction box, as shown in FIG. 7 the first insulating retainer 60 includes channels 64 in which the phase bars 30 are located that insulate the phase bars 30 from one another. As shown in FIG. 8, the second insulating retainer 70 includes clamping protrusions 74 that are aligned with the channels 64 in the first insulating retainer 60 that clamp against the phase bars 30 upon the first and second housing parts 24, 26 of the junction box 22 being connected together in the assembled position, as shown in FIG. 5. Accordingly, the clamping protrusions 74 press against the phase bars 30 holding them securely in the channel 64.

In order to allow for easier alignment of the first and second insulating retainers 60, 70 with one another, preferably at least one of the first or second insulating retainers includes an alignment projection 76 and the other of the first or second insulating retainers 60, 70 includes a corresponding alignment or receptacle 66 that receives the alignment projection 76. In the illustrated embodiment in FIGS. 7 and 8, there are two of the alignment projections 76 on the second insulating retainer 70 and two of the corresponding alignment receptacles 66 on the first insulating retainer 60. However, the number and position of these alignment projections 76 and receptacles 66 can be varied depending on the particular application.

The elastic tabs 62, 72 generate a preload based on their inherent elastic resiliency and based on the configuration wherein the elastic tabs 62, 72 extend past a respective outer surface 68, 78 of the first insulating retainer 60 or the second insulating retainer 70 in the non-installed state by a distance of about 0.5 mm, and more preferably, 1.0 mm, although the exact configuration can be adjusted for the specific application. For example, in order to compensate for tolerance accumulations of 4 mm, the elastic tabs 62, 72 extend past the respective outer surface 68, 78 by at least about 2 mm.

With respect to the electric vehicle drive 10, as discussed above, this also includes the emotor connection arrangement 20 including one or more of the features as described herein.

Using this arrangement, overheating of the phase bar connection is prevented and vibration of the phase bars 30 within the junction box 22 of the emotor connection arrangement 20 is also effectively prevented.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LIST OF REFERENCE NUMERALS 10 electric vehicle drive
11 power electronics
12 emotor
13 potting material
14 connection part
15 stator
16 rotor
17 bolted connection
18 torque convertor
19 bolted connection
20 connection arrangement
22 junction box
24 first housing part
25 inner surface of 24
26 second housing part
27 inner surface of 26
28 gasket
30 phase bars
40 first access cover
42 cooling fluid channel
43 linear path
43' curved path
44 cooling fluid inlet
46 cooling fluid outlet
48 bottom surface
50 second access cover
60 first insulating retainer
62 elastic tabs
64 channels
66 alignment receptacle
68 outer surface of 60
70 second insulating retainer
74 clamping protrusion
76 alignment projection
78 outer surface of 70

What is claimed is:

1. An emotor connection arrangement for connecting power electronics of an electric or hybrid electric vehicle to an emotor, the emotor connection arrangement comprising:
   a junction box that is configured to extend from the power electronics to the emotor;
   phase bars that extend in the junction box and are adapted to electrically connect the power electronics to the emotor;
   a first access cover removably connected to the junction box and configured to provide access for connecting the phase bars to the emotor;
   a second access cover configured to provide access for connecting the phase bars to the power electronics; and
   the first access cover including a cooling fluid channel with a cooling fluid inlet configured to be connected to a cooling fluid source and a cooling fluid outlet configured to be connected to a cooling fluid return.

2. The emotor connection arrangement of claim 1, wherein the first access cover includes a bottom surface that is configured to contact a potting material surrounding a connection part of the emotor that the phase bars are electrically connected to.

3. The emotor connection arrangement of claim 1, wherein the cooling fluid channel has a linear path and the cooling fluid inlet and the cooling fluid outlet are located on opposite sides of the first access cover.

4. The emotor connection arrangement of claim 1, wherein the cooling fluid channel has a curved path.

5. The emotor connection arrangement of claim 4, wherein the curved path is arranged such that the cooling fluid inlet and the cooling fluid outlet are located on a same side of the first access cover.

6. The emotor connection arrangement of claim 1, further comprising:
the junction box including a first housing part and a second housing part that are configured to be connected together in an assembled position;
a first insulating retainer configured to receive the phase bars;
a second insulating retainer configured to be placed on the first insulating retainer such that the phase bars are held between the first and second insulating retainers;
elastic tabs located on at least one of the first or second insulating retainers, the elastic tabs are configured to contact a respective inner surface of at least one of the first housing part or the second housing part, the elastic tabs being configured to generate a preload that presses the first and second insulating retainers toward one another and against the phase bars upon the first and second housing parts being connected together in the assembled position.

7. The emotor connection arrangement of claim 6, wherein the elastic tabs are located on each of the first and second insulating retainers.

8. The emotor connection arrangement of claim 6, wherein the first insulating retainer includes channels in which the phase bars are located that insulate the phase bars from one another.

9. The emotor connection arrangement of claim 8, wherein the second insulating retainer includes clamping protrusions that are aligned with the channels in the first insulating retainer for clamping against the phase bars.

10. The emotor connection arrangement of claim 9, wherein at least one of the first or second insulating retainer includes an alignment projection and the other of the first or second insulating retainer includes a corresponding alignment receptacle that receives the alignment projection.

11. The emotor connection arrangement of claim 6, wherein the elastic tabs are configured to compensate for total tolerance accumulations of 4 mm and apply a load that presses the first and second insulating retainers toward one another and against the phase bars.

12. The emotor connection arrangement of claim 6, wherein the first and second insulating retainers are formed of a glass filled polymer.

13. The emotor connection arrangement of claim 12, wherein the glass is between 10 and 50 wt-% of the glass filled polymer, and the polymer is PPS.

14. An electric vehicle drive, comprising:
an emotor including a stator and a rotor,
a transmission including a torque converter, and the rotor being connectable to the torque convertor;
power electronics configured to supply power to the emotor;
an emotor connection arrangement configured to connect the power electronics to the emotor, the emotor connection arrangement including:
a junction box that extends from the power electronics to the emotor;
phase bars that extend in the junction box and are electrically connected to the power electronics and the emotor;
a first access cover removably connected to the junction box and configured to provide access for connecting the phase bars to the emotor;
a second access cover removably connected to the power electronics and configured to provide access for connecting the phase bars to the power electronics; and
the first access cover including a cooling fluid channel with a cooling fluid inlet configured to be connected to a cooling fluid source and a cooling fluid outlet configured to be connected to a cooling fluid return.

15. The electric vehicle drive of claim 14, wherein the first access cover includes a bottom surface that is configured to contact a potting material surrounding a connection part of the emotor that the phase bars are electrically connected to.

16. The electric vehicle drive of claim 14, wherein the cooling fluid channel has a linear path and the cooling fluid inlet and the cooling fluid outlet are arranged on opposite sides of the first access cover.

17. The electric vehicle drive of claim 14, wherein the cooling fluid channel has a curved path.

18. The electric vehicle drive of claim 17, wherein the curved path is arranged such that the cooling fluid inlet and the cooling fluid outlet are located on a same side of the first access cover.

* * * * *